US006710702B1

(12) United States Patent
Averbuch et al.

(10) Patent No.: US 6,710,702 B1
(45) Date of Patent: Mar. 23, 2004

(54) METHOD AND APPARATUS FOR PROVIDING INFORMATION TO A PLURALITY OF COMMUNICATION UNITS IN A WIRELESS COMMUNICATION SYSTEM

(75) Inventors: Rod Averbuch, Buffalo Grove, IL (US); Israel A. Cimet, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/444,629

(22) Filed: Nov. 22, 1999

(51) Int. Cl.[7] ................................. H04Q 1/30
(52) U.S. Cl. ................ 340/7.1; 340/7.2; 455/426; 370/337; 370/347
(58) Field of Search ................ 340/7.1, 7.2; 455/426; 370/337, 347

(56) References Cited

U.S. PATENT DOCUMENTS

| | | | | |
|---|---|---|---|---|
| 5,398,021 A | * | 3/1995 | Moore | 340/825.27 |
| 5,481,254 A | * | 1/1996 | Gaskill et al. | 340/825.52 |
| 6,400,942 B1 | * | 6/2002 | Hansson et al. | 455/426 |

\* cited by examiner

*Primary Examiner*—Julie Lieu
(74) *Attorney, Agent, or Firm*—Steven A. May; Jeffrey K. Jacobs (57) ABSTRACT

A wireless communication system (100) employs a method and apparatus for providing information to multiple communication units (121–129). The communication system includes a communication infrastructure (101, 102, 103, 105, 111–113, 120), a data network (107) and an information source (109). The multiple communication units each subscribe to an information service provided by the information source. The communication infrastructure creates a subscription group that includes the multiple communication units. The infrastructure receives subscriber information including at least one information unit from the information source and sets up a point-to-multipoint group call with the subscription group. The infrastructure then transmits the subscriber information to the multiple communication units. Any information unit not confirmed by the multiple communication units is re-transmit by the infrastructure. If any information unit remains unconfirmed after the re-transmission, the infrastructure sets up a point-to-point communication session with individual communication units and re-transmits the remaining unconfirmed information unit.

7 Claims, 6 Drawing Sheets

METHOD AND APPARATUS FOR PROVIDING INFORMATION TO A PLURALITY OF COMMUNICATION UNITS IN A WIRELESS COMMUNICATION SYSTEM

FIELD OF THE INVENTION

This invention is generally related to wireless communication systems and, in particular, to providing information to multiple communication units in a wireless communication system.

BACKGROUND OF THE INVENTION

With the burgeoning growth of digital wireless communication systems and the internet, a market is evolving for accessing informational sources on the internet via digital wireless communication devices, such as digital pagers, digital cellular telephones, and digital radiotelephones. Affording users of a wireless communication system the ability to wirelessly access web-based servers is becoming an important feature of wireless communication infrastructure and subscriber unit equipment.

One way of implementing such is by use of "push" technology. In push technology, a user of a communication system subscribes to an information service operating a web-based server. The user receives general information widely broadcast to all subscribers to the service and receives information on topics of particular interest to the user. For example, suppose that the user subscribes to an information service that provides stock price information. The user can then receive stock ticker updates and can also receive, at periodic intervals, the latest news or periodic stock quotes with respect to particular stocks of the user's selection. Similar information services are or will also be provided for sports, news, and weather, among other items of interest, whereby a user will be able to receive a general information along with informational updates on topics of particular interest to the particular user.

An attraction of push technologies is that a user can expect to receive the latest information of particular interest to the user without the intervention of any other party. The simplest way to do this would be to use packet data technology and to transmit the information from a web-based server via the wireless infrastructure to each user individually. However, transmitting the informational updates via the infrastructure on a per user basis is both costly and inefficient because of the extensive communication system resources that would be occupied in the process of attempting to locate the subscription member user and then transmit the information every time an update is available for transmission. An alternative is for the infrastructure to perform a general, wide-area transmission of the informational update. However, a general, wide-area transmission would occupy an excessive amount of infrastructure resources and bandwidth in order to provide information to only a select number of subscription members.

Another problem in conveying information from a web-based server to a pool of subscription members is that the subscription members will be located in a variety of environments, some of which are noisier than others. Some subscription members will receive an informational update correctly on the first transmission, while other subscription members will require multiple retransmissions in order to receive a correct update. This problem can be overcome by establishing individual automatic retransmission request (ARQ) sessions between the infrastructure and each subscriber unit. As mentioned above, this would be very costly and inefficient. Other alternatives are to generally retransmit a wide-area message 'n' times or to add additional forward error correction to the information being transmitted. However, the former would be very wasteful of the limited available communication resources and the latter would consume bandwidth that can be better used to convey the information itself.

Therefore a need exits for a method and apparatus of providing information to multiple communication units in a wireless communication system, that selectively targets a limited group of communication units that need to receive a particular set of information and conveys the set of information utilizing a minimum amount of system resources and bandwidth.

DESCRIPTION OF A PREFERRED EMBODIMENT

To address the need for a method and apparatus of providing information to multiple communication units in a wireless communication system, that selectively targets a limited group of communication units that need to receive a particular set of information and conveys the set of information utilizing a minimum amount of system resources and bandwidth, a wireless communication system is provided that employs a method and apparatus for providing information to multiple communication units. The communication system includes a communication infrastructure, a data network, and an information source. The multiple communication units each subscribe to an information service provided by the information source. The communication infrastructure creates a subscription group that includes the multiple communication units. The infrastructure receives subscriber information including at least one information unit from the information source and sets up a point-to-multipoint group call with the subscription group. The infrastructure then transmits the subscriber information to the multiple communication units. Any information unit not confirmed by the multiple communication units is re-transmit by the infrastructure. If any information unit remains unconfirmed after the re-transmission, the infrastructure sets up a point-to-point communication session with individual communication units and re-transmits the remaining unconfirmed information unit.

Generally, the present invention encompasses a method for a communication infrastructure to provide information to multiple communication units in a wireless communication system. The communication system includes the communication infrastructure and an information source that includes an information service. The information is provided by the information service, and each communication unit of the plurality of communication units subscribes to the information service. The method includes the steps of receiving registration information from each communication unit of the multiple communication units, wherein the registration information for each communication unit includes a communication unit identifier and an information service identifier, and conveying information to the information source based on the registration information received from each communication unit. The method further includes the steps of determining, for each communication unit, an information service identifier and a communication unit identifier based on the registration information received from the communication unit, to produce multiple information service identifiers and multiple communication unit identifiers, determining a subscription group based on at least one information service identifier of the multiple information service identifiers, wherein the subscription group includes a subscription group identifier, and adding each communication unit identifier of the multiple communication unit identifiers to the subscription group. The method further includes the steps of determining a location of each communication unit and storing the location of each communication unit in a location database. The method further includes the steps of receiving subscriber information from the information source and transmitting the subscriber information to the multiple communication units with reference to the subscription group database and the location database.

Another embodiment of the present invention encompasses a method for the reliable transmission of information by a communication infrastructure to a communication unit, wherein the communication infrastructure and the communication unit are included in a wireless communication system that further includes an information source. The method includes the steps of receiving information from the information source to produce subscriber information and storing the subscriber information. The method further includes the steps of determining a subscription group based on the subscriber information, wherein the subscription group includes a subscription group identifier and a communication unit identifier, determining a communication unit identifier based on the subscription group, and determining a communication unit location based on the communication unit identifier. The method further includes the steps of transmitting a paging message that includes the at least one communication unit identifier, and transmitting the subscriber information.

Finally, the present invention encompasses a communication infrastructure for use in a wireless communication system that includes the communication infrastructure, an information source, and a communication unit. The communication infrastructure includes a base site, a data distribution server coupled to the base site, a system router coupled to the base site and to the data distribution server, a system controller coupled to the system router, a subscription group database coupled to the system controller, and a location database coupled to the system controller. The base site services a communication unit, wherein the communication unit subscribes to an information service provided by an information source. The data distribution server receives registration information from the communication unit, wherein the registration information includes an information service identifier and a communication unit identifier, conveys at least a portion of the registration information to the information source, conveys at least a portion of the registration information to the system router, receives subscriber information from an information source, and conveys the subscriber information to the system router. The system router determines an information service identifier based on the registration information received from the communication unit, conveys the information service identifier and the communication unit identifier to the system controller, receives the subscriber information from the data distribution server, and transmits the subscriber information with reference to the subscription group database and the location database. The system controller determines a subscription group based on the information service identifier received from the system router and with reference to the subscription group database, and adds the communication unit identifier to the subscription group. The subscription group database includes a subscription group, wherein the subscription group includes an information service identifier and a communication unit identifier. The location database includes a location of the communication unit.

Figure 1:
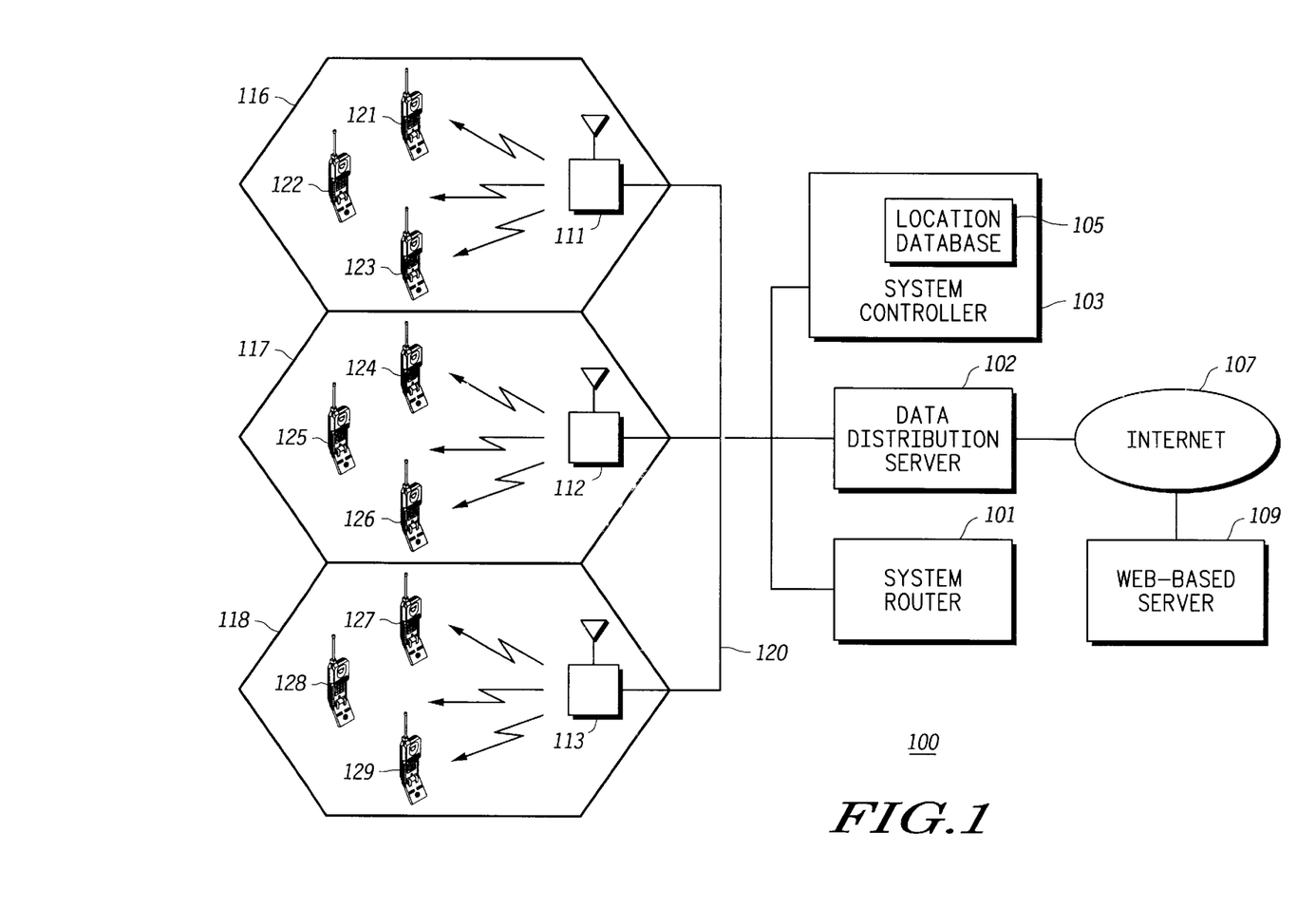
FIG. 1 is a block diagram of a communication system in accordance with a preferred embodiment of the present invention.
Figure 2:
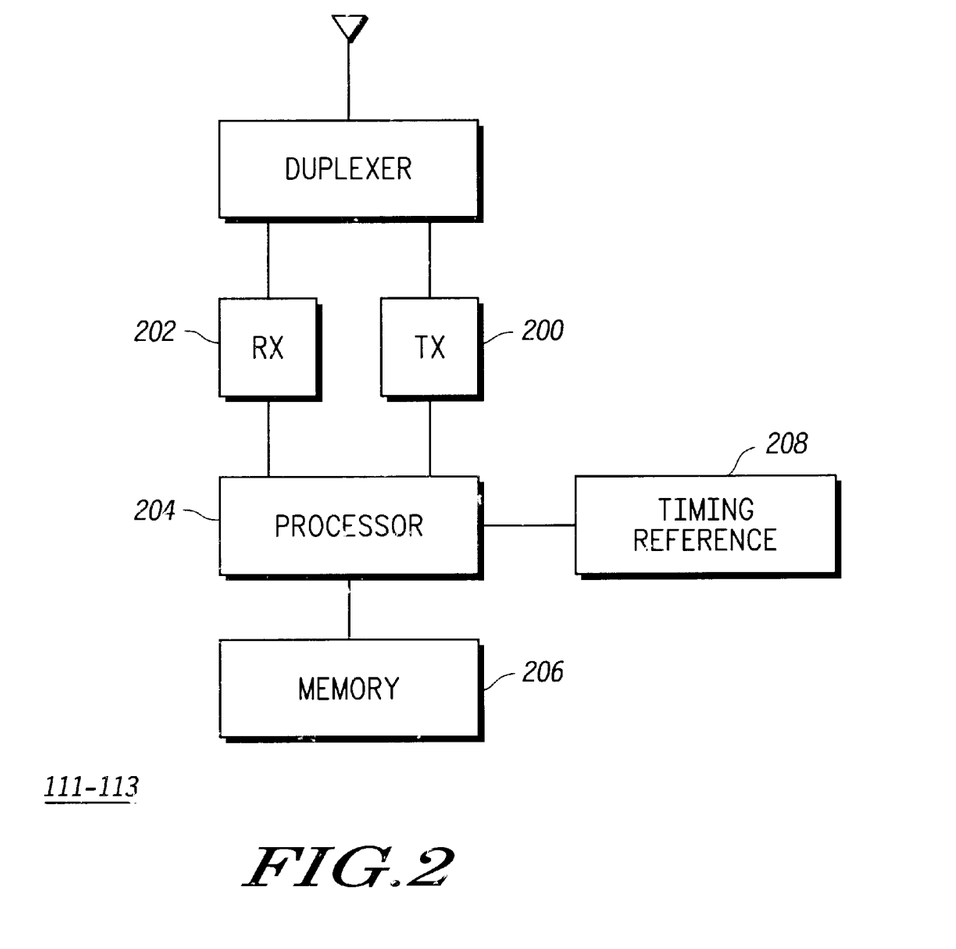
FIG. 2 is a block diagram of a base site in accordance with a preferred embodiment of the present invention.

Turning now to the drawings, wherein like numerals designate like components, FIG. 1 illustrates a wireless communication system 100, preferably a packet data communication system, in accordance with a preferred embodiment of the present invention. The packet data communication system 100 includes a system router 101, preferably a packet data router that preferably includes a "MOTOROLA" Mobile Data Gateway (MDG), a data distribution server 102, a system controller 103, preferably a dispatch controller that preferably includes a "MOTOROLA" Dispatch Application Processor (DAP), multiple base sites 111–113 (three shown), and multiple communication units 121–129 (nine shown). Packet data router 101, data distribution server 102, and dispatch controller 103 each include instruction sets, processors and memories that allow them to perform the functions set forth herein. An MDG and a DAP are commercially available from Motorola, Inc., of Schaumburg, Ill. Base sites 111–113 each preferably include an "IDEN" Enhanced Base Transceiver System (EBTS) that also is commercially available from Motorola, Inc. of Schaumburg, Ill. As shown in FIG. 2, each of base sites 111–113 preferably includes a processor 204, preferably a microprocessor, coupled to a transmitter 200, a receiver 202, a memory 206, preferably a random access memory (RAM), and a timing reference unit 208. Each base site 111–113 provides communication services to a corresponding service coverage area 116–118. Communication units 121–129 each preferably include a mobile radio, a portable radio, a radiotelephone, or a wireless data terminal.

The packet data router 101, data distribution server 102, dispatch controller 103, and multiple base sites 111–113 are coupled to each other by a network 120 and together with network 120 are referred to as a fixed communication infrastructure. The data distribution server 102 is coupled to a data network 107, preferably the Internet, and provides a gateway between the fixed communication infrastructure and Internet 107. Also coupled to Internet 107 is an information source 109, preferably a web-based information server. Web-based server 109 includes an Internet information service that generates subscriber information for subscribers to the service, i.e., information subscribers. Preferably, the communication infrastructure also includes a location database 105 that preferably includes a memory device, such as a random access memory (RAM), in which is stored a the locations of all communication units 121–129 in the system 100. Preferably, location database 105 is located in dispatch controller 103.

Each communication unit 121–129 registers with communication system 100 as follows in accordance with a preferred embodiment of the present invention. When the communication unit 121–129 desires to become active in communication system 100, the communication unit registers with the infrastructure, preferably packet data router 101 and dispatch controller 103, via a base site (e.g., any one of base sites 111–113) in accordance with known techniques. In the preferred embodiment of the present invention, among the items of registration information conveyed by the communication unit to packet data router 101 when registering are an identifier, preferably an identification number, uniquely assigned to the communication unit (communication unit ID), an information service identifier (information service ID), preferably a numerical sequence, corresponding to the information service, a subscription number corresponding to the communication unit's subscription to the information service, and routing information, such as an Internet Protocol (IP) address or a domain name, corresponding to the information source 109.

When each communication unit 121–129 registers with the infrastructure, the communication unit also registers with an information service (e.g., an information service provided by web-based server 109) via data distribution server 102. Data distribution server 102 receives the registration information from the communication unit and registers the communication unit with the appropriate information service (i.e., web-based server 109). The data distribution server 101 conveys, to web-based server 109, the data distribution server's 101 IP address and the registration information relating to the communication unit's subscription to the information service, and web-based server 109 stores the information. Data distribution server 102 also conveys to packet data router 101 registration information for the communication unit, which registration information includes the communication unit ID and the information service ID. Packet data router 101 creates and stores a communication unit record for the communication unit, which communication unit record includes the registration information, and conveys the registration information to dispatch controller 103.

When dispatch controller 103 receives the registration information from data distribution server 102, dispatch controller 103 checks a subscription group database to determine whether a subscription group has been created for the information service ID. The subscription group database comprises subscription groups that include at least one communication unit 121–129 active in system 100. A subscription group comprises the communication unit ID's for all communication units active in communication system 100 that are registered with an information service and a subscription group identifier, preferably the information service ID, that uniquely identifies the information service. The subscription groups are stored in a subscription group database. Preferably, the subscription group database is located in dispatch controller 103; however, those who are of ordinary skill in the art realize that the subscription group database can be located anywhere in the communication infrastructure without departing from the spirit and scope of the present invention, such as locating the database in the system router 101 or in a separate memory, or subdividing the database and storing subdivided portions in multiple base sites 111–113, so long as the database can be accessed by dispatch controller 103.

If dispatch controller 103 determines that a subscription group already exists, then dispatch controller 103 adds the communication unit ID for the registering communication unit to the subscription group. If dispatch controller 103 determines no subscription group exists for the information service ID, then dispatch controller 103 creates a new subscription group in the subscription group database, which subscription group includes the communication unit ID for the registering communication unit and the information service ID.

In the preferred embodiment, each registering communication unit 121–129 selects a serving base site 111–113. The communication unit determines a signal quality metric, such as a carrier-to-interference plus noise ratio (C/I+N), for signals received by the communication unit from one or more of the multiple base sites 111–113. The communication unit determines a base site 111–113 to be the serving base site based on the signal quality metric determination and conveys the serving base site determination to the infrastructure, preferably to dispatch controller 103. The serving base site then manages and provides radio communication services for the served communication unit while the communication unit is located in the serving base site's service coverage area. Dispatch controller 103 conveys the serving base site information along with the communication unit ID to packet data router 101, and dispatch controller 103 updates location database 105 to reflect the present location of the communication unit.

Similarly, the handoff of a communication unit 121–129 to a new base site 111–113 is based on a determination, by the communication unit, of a signal quality metric for signals received by the communication unit from one or more of the multiple base sites 111–113. The communication unit determines a base site 111–113 to be the new base site based on the signal quality metric determination and conveys the new base site determination to the infrastructure, preferably to dispatch controller 103. Dispatch controller 103 updates location database 105 to reflect the new location of the communication unit and conveys the serving base site information along with the communication unit ID to packet data router 101. Those who are of ordinary skill in the art will realize that the above signal quality metric determinations alternatively may be based on signals received by at least one of the multiple base sites 111–113 from the communication unit and alternatively may be made by the infrastructure, and that the determination of a serving base site or a new base site may be made by the infrastructure, such as by at least one of base sites 111–113 or by packet data router 101, without departing from the spirit and scope of the present invention.

When a communication unit 121–129 desires to de-register with an information service, the communication unit may de-register expressly, for example by conveying to the communication infrastructure, preferably to data distribution server 102 via a base site 111–113, a request to de-register with the information service, or may de-register impliedly, for example by detaching from system 100 by shutting down. Preferably, the request to de-register includes the communication unit ID corresponding to the communication unit and an information service ID for the information service to which the communication unit subscribes. Alternately, the information service ID can be determined based on the communication unit ID and by reference to the subscription group database or by reference to the communication unit record. Based on the de-registration information, data distribution server 102 determines that web-based server 109 is the information source corresponding to the information service and informs web-based server 109 of the de-registration of the communication unit. Data distribution server 102 also informs packet data router 101 of the de-registration of the communication unit. Packet data router 101 removes the information service ID from the communication unit record for the de-registering communication unit or, in the event of a detaching communication unit, removes the communication record from packet data router's 101 memory. Packet data router 101 also informs dispatch controller 103 of the de-registration of the communication unit. Dispatch controller 103 deletes the communication unit ID for the de-registering communication unit from the subscription group for the information service ID associated with the information service. If the de-registering communication unit is the only active communication unit included in the subscription group, that is if the de-registering communication unit's communication unit ID is the only communication unit ID in the subscription group, then dispatch controller 103 removes the subscription group from the subscription group database upon de-registration of the communication unit.

As described above, the present invention provides for the dissemination of information from an Internet information service to a group of subscribing communication units by creating a call group, or subscription group, comprising the subscribing communication units. When each subscribing communication unit registers with the infrastructure, the communication unit informs the infrastructure of an information service to which the communication unit subscribes. The infrastructure registers the unit with the information service and adds the communication unit to a subscription group for the information service. When the infrastructure receives subscriber information intended for subscribers to the information service, the infrastructure can then identify the subscribers to the information service and disseminate the subscriber information to the members of the subscription group.

Communication system 100 transmits information to a communication unit 121–129 as follows in accordance with a preferred embodiment of the present invention. For purposes of illustration, it is assumed hereinafter that communication units 121–123 are each serviced by base site 111, communication units 124–126 are each serviced by base site 112, and communication units 127–129 are each serviced by base site 113. It is further assumed that each of communication units 121–129 subscribe to an information service provided by web-based server 109.

In the preferred embodiment, data distribution server 102 receives subscriber information from an information service (i.e., the information service provided by web-based server 109). The subscriber information, preferably packet data, is intended for subscribers to the information service (i.e., communication units 121–129) and preferably includes one or more information units, wherein each information unit preferably includes a data packet. Data distribution server 102 receives the one or more data packets and determines an information service ID. Preferably, the information service ID is a numerical sequence that is uniquely associated with the information service and is either contained in each data packet or is determined based on information contained in the data packet. Data distribution server 102 then conveys the information service ID and the subscriber information to packet data router 101.

Packet data router 101 stores the information service ID and the subscriber information and conveys a request for a group call to dispatch controller 103. The request includes the information service ID. In response to the request to set up a group call, dispatch controller 103 determines, based on the information service ID and by reference to the subscription group database, the communication units (i.e., communication units 121–129) that are to partake in the group call. Dispatch controller 103 also determines a location (i.e., a serving base site) of each communication unit that is a member of the subscription group by reference to location database 105. Dispatch controller 103 conveys the determined locations, preferably a list of serving base sites, to packet data router 101.

Dispatch controller 103 then transmits a paging message to the subscription group members (i.e., communication units 121–129) via the determined serving base sites (i.e., base sites 111–113). Each base site 111–113 comprises multiple radio frequency (RF) communication channels. In the preferred embodiment, the communication system 100 comprises a time division multiple access (TDMA) communication system. A TDMA communication system comprises multiple RF communication channels wherein each RF communication channel comprises a time slot of an RF carrier. However, those of ordinary skill in the art will realize that system 100 might comprise any one of a variety of RF communication channels, such as an RF carrier (e.g., in a frequency division multiple access (FDMA) communication system) or an orthogonal code (e.g., in a code division multiple access (CDMA) communication system), without departing from the spirit and scope of the present invention. At each base site 111–113, one of the multiple RF communication channels is reserved for paging messages (i.e., a control channel). A second RF communication channel is reserved for packet data transmissions (i.e., a packet channel). Each of the determined serving base sites 111–113 transmits the paging message on the control channel. The paging message comprises the communication unit ID's for all subscription group members served by the base site and informs each identified communication unit to tune to a packet channel reserved at the serving base site.

Each communication unit 121–129 is tuned to the control channel at its respective serving base site when the communication unit is not in session. Each communication unit 121–123 receives the paging message via the control channel and determines, based upon recognition of the communication unit's communication unit ID, whether the communication unit is an intended recipient of the paging message. If the communication unit recognizes its own ID, then the communication unit listens to the reserved packet channel as informed by the paging message.

Packet data router 101 then transmits the packet data, comprising at least one data packet, to the subscription group members (i.e., communication units 121–129) via the serving base sites (i.e., base sites 111–113) and each serving base site's packet channel. Preferably, packet data router 101 stores a copy of the subscriber information and information service ID. In the preferred embodiment, each serving base site 111–113, in addition to transmitting the subscriber information, also stores a copy of the subscriber information after receiving the subscriber information from packet data router 101.

In the preferred embodiment, each intended recipient of the subscriber information (i.e., each communication unit of communication units 121–129) confirms correct receipt of a data packet by transmitting an acknowledgment. Acknowledgments are well known in the art and will not be described in detail. The communication infrastructure receives each acknowledgment via a base site 111–113. In an alternate embodiment of the present invention, each communication unit 121–129 confirms correct receipt of a data packet by transmitting an index of the packets incorrectly received (or not received at all), or alternatively of packets correctly received. If an index of incorrectly received packets is transmitted and a packet is not included therein, the packet is assumed by the infrastructure to have been correctly received by the communication unit. After transmitting confirmations of all correctly received data packets, each communication unit 121–129 camps back on the control channel at the communication unit's respective serving base site 111–113. If all subscribing communication units 121–129 confirm all data packets, then the process of transmitting the data packets ends and the serving base sites 111–113 and packet data router 101 each delete the subscriber information from their respective memories.

In general, the present invention provides for the dissemination of information from an Internet information service to a group of subscribing communication units by transmitting the information, preferably packet data including data packets, to a call group, or subscription group, including the subscribing communication units. In the preferred embodiment, the members of the subscription group are stored in an subscription group database in the infrastructure, and the locations (i.e., serving base sites) of the members are stored in a location database in the infrastructure. When the infrastructure receives the information, the information is conveyed to the base sites serving each member of the subscription group. Each serving base site then stores the information and transmits the information to the group members by a point-to-multipoint communication session. The communication session is point-to-multipoint in that the communication session comprises information that is being sent by a data router (the "point" in point-to-multipoint) to multiple communication units (the "multipoint" endpoints in point-to-multipoint) via at least one base site. The infrastructure transmits the information by first paging the group members and informing the members to listen to one or more communication channels (i.e., packet channels) over which the information will be transmitted, and then by transmitting the information over the one or more packet channels. Each data packet correctly received by a group member is acknowledged by the group member.

The communication infrastructure, preferably each serving base site 111–113, determines, based on the acknowledgments (or, alternatively, indices) received from each subscription group member (i.e., each communication unit of communication units 121–129), which data packets have been not correctly received by which subscription group members. Preferably, the determination is made by each serving base site 111–113, which base site determines which data packets have been not correctly received by the communication units serviced by the base site. The infrastructure, preferably each serving base site, then retransmits the data packets not acknowledged by multiple group members serviced by the base site.

Retransmission by each serving base site 111–113 of the data packets not acknowledged by multiple communication units serviced by the base site occurs as follows in accordance with the preferred embodiment. Dispatch controller 103 transmits a paging message, via the control channel, requesting that the subscription group members served by the base site again listen to the packet channel. The paging message includes the subscription group members' communication unit ID's and information concerning the packet channel at the serving base site. Each subscription group member, upon receipt of the paging message and recognition of the member's communication unit ID, listens to the packet channel. The serving base site then retransmits, via the packet channel at the serving base site, each data packet not correctly received by multiple group members served by the base site. Each subscription group member served by the base site confirms correct receipt of a retransmitted packet by transmitting an acknowledgment, or alternatively an index of not correctly received, or an index of correctly received, packets. The serving base site then determines, based on the confirmations received by the infrastructure, which data packets remain unconfirmed by multiple members served by the base site.

The serving base site continues to retransmit, after waiting a period of time for a confirmation prior to each retransmission, each data packet not correctly received by multiple group members served by the base site until correct receipt of the packet has been confirmed by at least all but one group member served by the base site. Alternatively, the above process of retransmitting a data packet terminates after a predetermined number of transmissions or after the expiration of a predetermined period of time. Upon the termination of the above retransmission process, the serving base site transmits an end of transmission signal to the subscription group members and each subscription group member, upon receiving the end of transmission signal, camps back on the control channel at the serving base site. If all data packets have been confirmed by all subscription group members served by the base site, then the serving base site deletes the subscriber information from the serving base site's memory.

In general, the present invention provides for the retransmission of incorrectly received data packets, or data packets that are not received at all, by a second point-to-multipoint communication session. In the second point-to-multipoint communication session, the "point" is moved up to a serving base site, while the "multipoint" endpoints are the multiple subscription group members serviced by the base site. The serving base site retransmits, via a packet channel, all data packets that are not correctly received by multiple subscription group members serviced by the base site. Each data packet correctly received by a group member is acknowledged by the group member.

In the preferred embodiment, after the termination of the retransmissions of the packets not confirmed by multiple subscription group members served by a base site 111–113, the infrastructure, preferably the serving base site, sets up and manages point-to-point sessions with each subscription group member with respect to any remaining data packet that has not been confirmed by the subscription group member. In an alternate embodiment of the present invention, any one or more of the functions performed below by the serving base site may be performed by packet data router 101, except that packet data router 101 transmits information to, or receives information from, a subscription group member via a base site.

In setting up point-to-point sessions, the serving base site 111–113 individually assigns a separate RF communication channel, preferably another packet channel that may or may not be the same as the communication channel used in the point-to-multipoint communications, to each subscription group member that is served by the base site and that has not yet confirmed receipt of all data packets. The serving base site 111–113 informs dispatch controller 103 of the separately assigned channel and dispatch controller 103 transmits a new paging message, via the control channel, to the subscription group member. The paging message comprises the subscription group member's unique communication unit ID and information concerning the separately assigned packet channel. The subscription group member, upon receipt of the paging message and recognition of the member's communication unit ID, listens to the separately assigned channel. The serving base site then transmits, via the separately assigned packet channel, all of the subscription group member's unconfirmed data packets. Upon correct receipt of each data packet, the subscription group member transmits an acknowledgment back to the serving base site. The serving base site 111–113 retransmits, via the separately assigned packet channel, and continues to retransmit via the separately assigned packet channel, to the subscription group member all packets unacknowledged by the subscription group member.

The retransmissions to the subscription group member terminate when all packets have been acknowledged by the subscription group member, or alternatively upon the completion of a predetermined number of retransmissions or upon the expiration of a predetermined period of time. Upon termination of all retransmissions to subscription group members served by the serving base site 111–113, the serving base site 111–113 transmits an end of transmission message to each subscription group member assigned a separate packet channel and deletes the subscriber information from the base site's memory. And upon termination of retransmissions by all serving base sites 111–113, packet data router 101 deletes the subscriber information from packet data router's 101 memory.

In general, the present invention provides for the establishment of point-to-point communication sessions for the transmission of data packets that have not been correctly received by all subscription members served by a base site after the second point-to-multipoint communication session. The base site individually assigns a separate communication channel to each subscription group member that is served by the base site and that has not yet confirmed receipt of all data packets that are a part of the packet data. The communication infrastructure pages each subscription group member to inform the subscription group member of the assigned communication channel and then transmits all remaining unacknowledged (i.e., unacknowledged by the subscription group member) data packets via the assigned communication channel.

Figure 3:
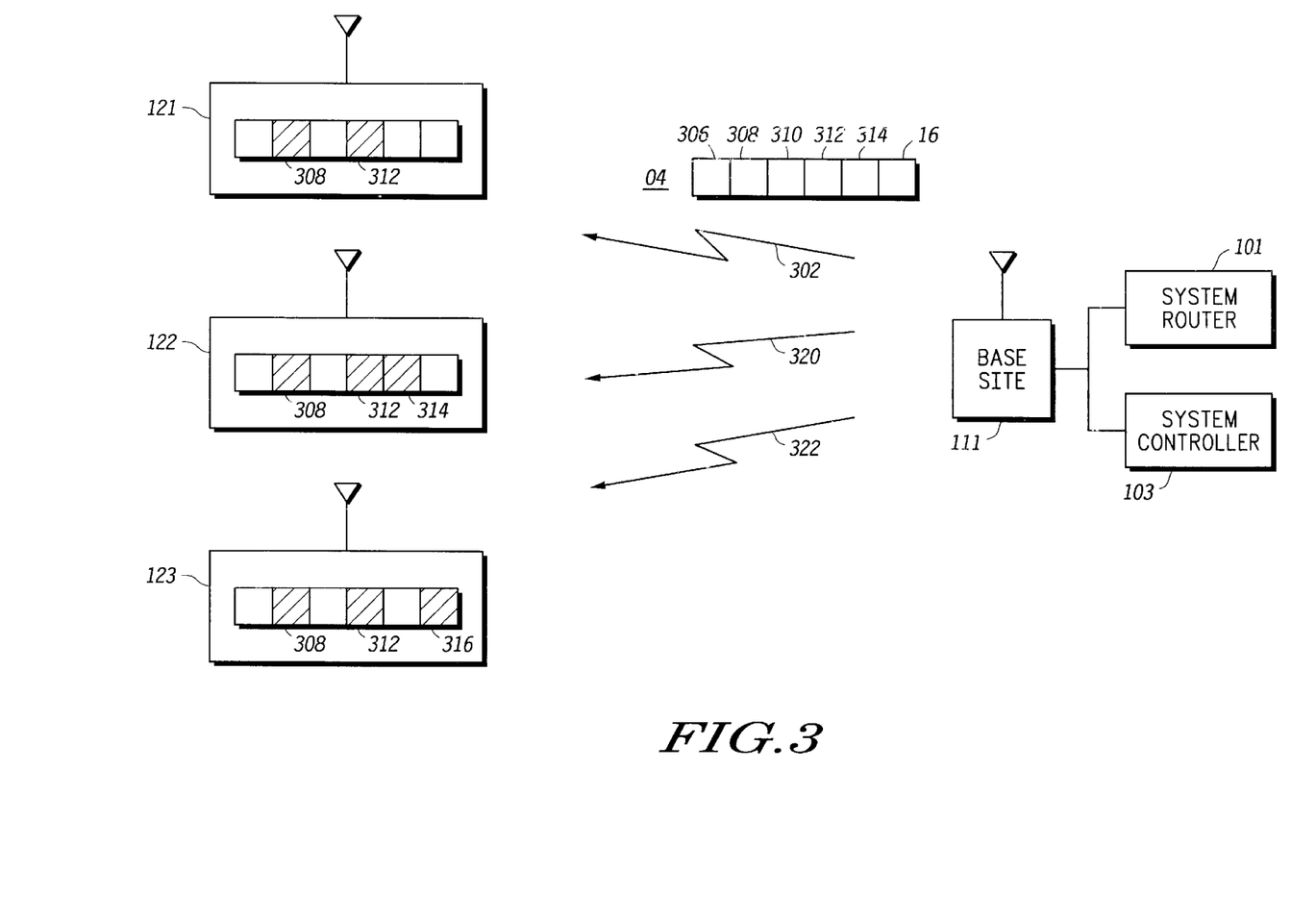
FIG. 3 is a block diagram of a communication between a base site and multiple communication units serviced by the base site in accordance with a preferred embodiment of the present invention.

For purposes of illustration of the present invention, FIG. 3 depicts a communication between a base site (e.g., base site 111) and communication units serviced by the base site (e.g., communication units 121–123) in accordance with a preferred embodiment of the present invention. As mentioned above, communication units 121–123 are all served by base site 111, are all subscribers to the same information service, and are all members of the same subscription group. Data distribution server 102 receives subscriber information, preferably packet data, from web-based server 109 intended for subscribers to the information service. Data distribution server 102 conveys the packet data to packet data router 101. Packet data router 101 determines, as described above, the information service ID affiliated with the packet data and requests that dispatch controller 103 set up a group call.

As described above, in response to the request to set up a group call, dispatch controller 103 determines the communication units subscribing to the information service (i.e., communication units 121–129), determines the one or more base sites (i.e., base sites 111–113) servicing the communication units, and transmits a paging message to the communication units via the serving base sites and a control channel at each serving base site. The paging message transmitted by each serving base site includes the communication unit ID's of the communication units 121–129 and instructions to listen to a packet channel at the serving base site (e.g., packet channel 302 at base site 111). Packet data router 101 then transmits subscriber information 304 (e.g., packet data 304 comprising data packets 306–316) to the communication units via the serving base sites and the packet channels. The serving base sites store the subscriber information 304 in the serving base sites' respective memories. Packet data router 101 then transmits an end of transmission message to communication units 121–129 via the serving base sites 111–113 and the packet channel at each serving base site, and communication units 121–129 camp back on the control channels at their respective base sites 111–113.

As shown in FIG. 3, after the transmission of packet data 304 by packet data router 101, communication unit 121 acknowledges correct receipt of data packets 306, 310, and 314–316, communication unit 122 acknowledges correct receipt of data packets 306, 310, and 316, and communication unit 123 acknowledges correct receipt of data packets 306, 310, and 314. Since correct receipt of data packets 306 and 310 have been confirmed by all subscription group members served by base site 111 (i.e., communication units 121–123), data packets 306 and 310 are not retransmitted. However, none of the subscription group members served by base site 111 have acknowledged data packets 308 and 312. Dispatch controller 103 transmits a paging message, via base site 111 and the control channel at base site 111, comprising communication unit ID's for communication units 121–123 and instructions to listen to packet channel 402. Base site 111 then retransmits data packets 308 and 312 via packet channel 302 and continues to retransmit each of data packets 308 and 312 via the packet channel until correct receipt of the data packet is confirmed by at least two of the three communication units 121–123.

Assuming that the retransmission of data packets 308 and 312 is confirmed by all three subscribing communication units 121–123, base site 111 transmits an end of transmission message and communication units 121–123, upon receiving the end of transmission message, camp back on the control channel. Serving base site 111 then sets up point-to-point sessions with each communication unit that has unconfirmed data packets outstanding (i.e., communication units 122, 123). In setting up the point-to-point sessions, serving base site 111 assigns a separate available RF communication channel to each communication unit (i.e., communication units 122, 123) with remaining unacknowledged packets. For example, as shown in FIG. 3, serving base site 111 assigns RF communication channel 320 to communication unit 122 and RF communication channel 322 to communication unit 123. Communication unit 121 is not assigned an RF communication channel since communication unit 116 has confirmed correct receipt of all data packets 306–316. As described above, one physical RF carrier can comprise multiple RF communication channels (e.g., a TDMA system) or each RF communication channel can comprise a separate physical RF carrier.

Base site 111 then conveys information concerning the separately assigned communication channels 320, 322 to dispatch controller 103 and dispatch controller 103 transmits a paging message, via the control channel, to each of communication units 122, 123. Each paging message comprises the communication unit's communication unit ID and information concerning the channel 320, 322 separately assigned to the communication unit. Each communication unit 122, 123 listens to the communication unit's respectively assigned channel 320, 322, and base site 111 transmits, via the assigned channel 320, 322, the communication unit's remaining unconfirmed data packets. For example, packet data router 101 transmits data packet 314 to communication unit 122 via communication channel 320 and data packet 316 to communication unit 123 via communication channel 322. In response to the correct receipt of a data packet, each communication unit 122, 123 transmits a confirmation, preferably an acknowledgment or alternatively an index. After waiting for an acknowledgment prior to each retransmission, base site 111 retransmits, and continues to retransmit, unconfirmed data packets to each communication unit until all packets have been acknowledged by the communication unit.

In general, the present invention as described above provides a communication system and method for reliably and economically transmitting information from a wireless communication infrastructure to a select group of communication units. By engaging in two stages of point-to-multipoint communication sessions for the wide broadcast of data packets whose correct receipt is not confirmed by multiple communication units, and reserving a final point-to-point communication session for the retransmission of unconfirmed to a minimal number of communication units, the present invention provides a method and communication system that selectively targets a limited group of communication units that need to receive a particular set of information and reliably conveys the set of information utilizing a minimum amount of infrastructure resources and bandwidth.

Figure 4:
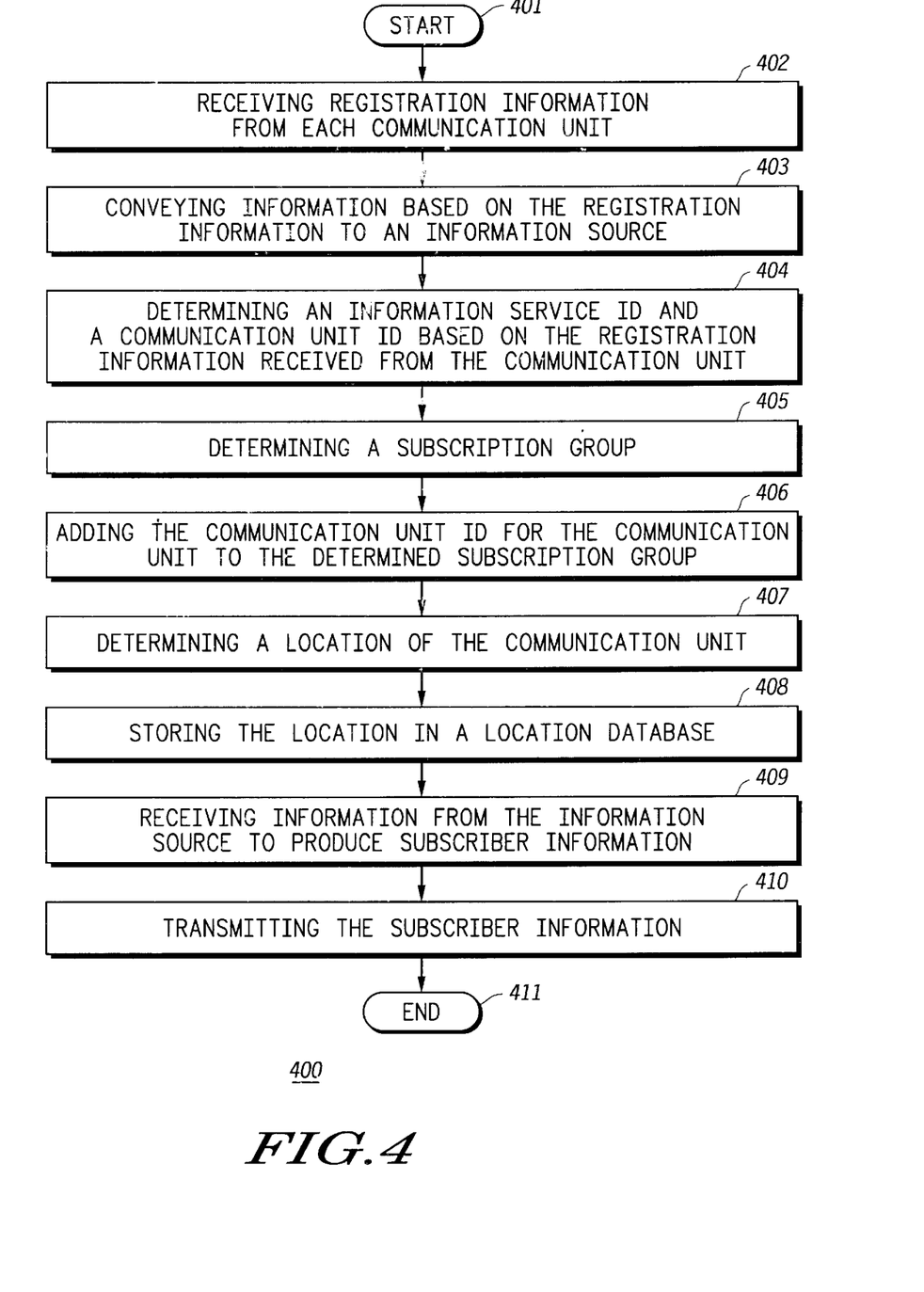
FIG. 4 is a logic flow diagram of steps executed by a communication infrastructure to provide an information service to multiple communication units in accordance with a preferred embodiment of the present invention.

FIG. 4 illustrates a logic flow diagram 400 of steps executed by a communication infrastructure to provide information to multiple communication units in accordance with a preferred embodiment of the present invention. Preferably, the communication infrastructure comprises a system router, a data distribution server, a system controller, and a base site, and each of the multiple communication units is serviced by the base site. The logic flow begins (401) when the communication infrastructure, preferably a data distribution server via a base site, receives (402) registration information from each communication unit of the multiple communication units. The registration information preferably includes a communication unit identifier (communication unit ID), an information service identifier (information service ID) corresponding to an information service, and routing information, such as an Internet address or a domain name, for an information source that provides the information service. Preferably, the information source is a web-based server. Information services provided by web-based servers are well known in the art. Examples of such services are a stock information service providing stock market information and stock price updates, a weather information service providing current weather conditions and weather updates, and a sports information service providing sporting news and sports scores updates. The communication infrastructure, preferably the data distribution server, then conveys (403) information to the web-based server, which information is based on the registration information received from each communication unit. In the preferred embodiment, the information conveyed to the web-based server includes subscription information, such as a subscription number, for the communication unit and routing information, such as an Internet address, associated with the communication infrastructure and the data distribution server.

The communication infrastructure, preferably the data distribution server, determines (404) an information service ID and a communication unit ID for each communication unit based on the registration information received from the communication unit. In the preferred embodiment, the data distribution server then conveys the information service ID and the communication unit ID to the system router and the system controller. The communication infrastructure, preferably the system controller, then determines (405) a subscription group for each communication unit. The subscription group includes a subscription group identifier, preferably the information service ID, or alternatively a numerical sequence based on the information service ID, that uniquely identifies the subscription group.

In the preferred embodiment, the step of determining a subscription group for each communication unit comprises the step of determining whether a subscription group exists based on the registration information received from the communication unit. The communication infrastructure determines whether a subscription group exists by searching a subscription group database for the information service ID contained in the registration information of the communication unit. When no subscription group exists, the step of determining a subscription group further comprises the steps of creating a subscription group comprising a subscription group identifier, preferably the information service ID, and storing the subscription group in the subscription group database. Preferably, the subscription group database is located in the system controller; however, those who are of ordinary skill in the art realize that the database can be located anywhere in the communication infrastructure without departing from the spirit and scope of the present invention, such as locating the database in the system router or in a separate memory, or subdividing the database and storing subdivided portions in multiple base sites, so long as the database can be accessed by the system controller. The communication infrastructure then adds (406) the communication unit ID for the communication unit to the determined subscription group.

In the preferred embodiment, the subscription group, which comprises a information service ID and each communication unit ID that is added to the subscription group, are all stored in the subscription group database. The communication infrastructure also determines (407) a location, preferably a serving base site, of the communication unit and stores (408) the location in a location database. The communication infrastructure receives (409) information from the information source, preferably a web-based server that generates information intended for subscribers to the information service provided by the information source, to produce subscriber information. The communication infrastructure transmits (410) the subscriber information to the multiple communication units with reference to the subscription group database and the location database, and the logic flow ends (411).

In general, the present invention as described in FIG. 4 provides a method for the dissemination of information from an Internet information service to a group of subscribing communication units by creating a subscription group comprising the subscribing communication units. In the present invention, when each subscribing communication unit registers with a communication infrastructure, the infrastructure receives from the communication unit a unique communication unit ID and information identifying the information service. The present invention provides a method whereby the infrastructure registers the communication unit with the information service and sets up a subscription group, or call group, of subscribers to the service. The subscription group is stored in a subscription group database and includes an identifier of the information service and the identifiers of all registered communication units that subscribe to the service. If a registering communication unit subscribes to an information service for which a subscription group has already been set up, then the infrastructure adds the identifier for the communication unit to the subscription group. The infrastructure also stores the location, preferably the serving base site, of each communication unit in a location database.

When the infrastructure receives subscriber information intended for subscribers to the information service, the infrastructure identifies the communication units that subscribe to the information service by reference to the subscription group database and identifies the locations of the subscribing units by reference to the location database. The infrastructure then transmits the subscriber information to the subscribing units.

Figure 5:
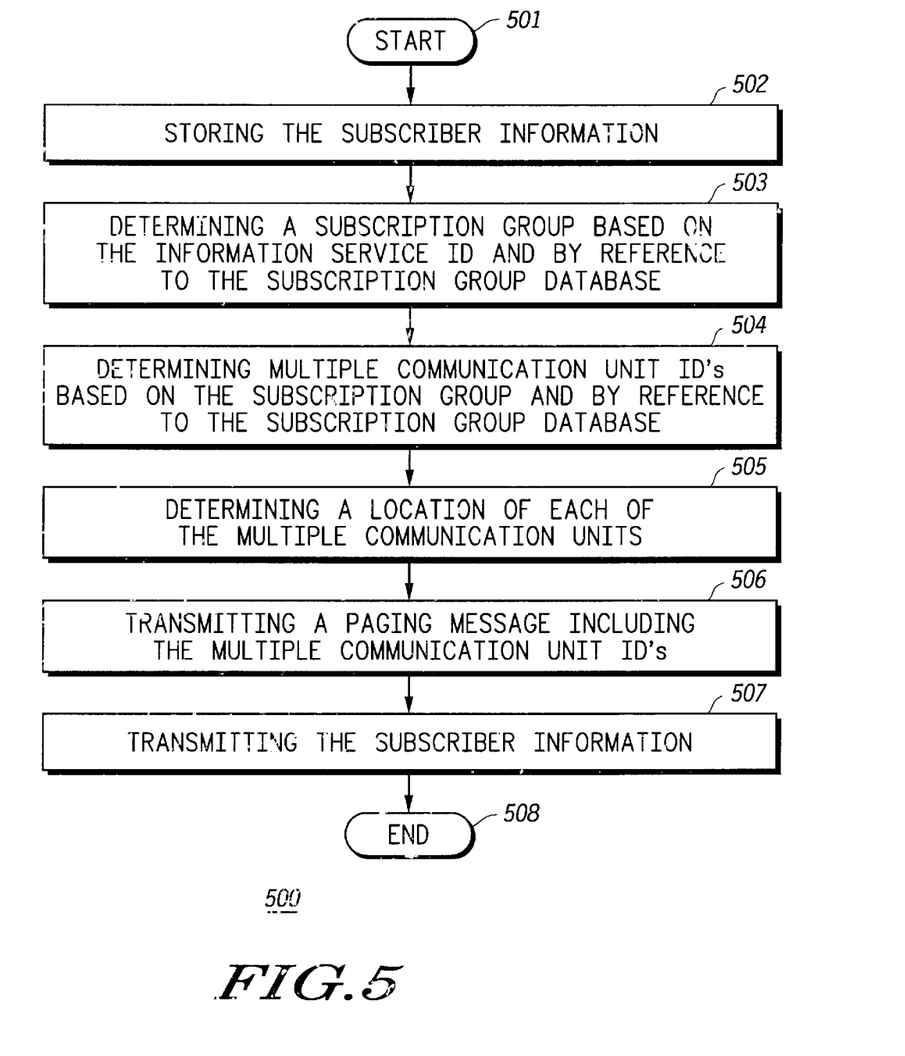
FIG. 5 is a logic flow diagram of steps executed by a communication infrastructure to transmit subscriber information to the multiple communication units in accordance with a preferred embodiment of the present invention.

FIG. 5 illustrates a logic flow diagram 500 of steps executed by a communication infrastructure to reliably transmit the subscriber information to each communication unit of the multiple communication units in accordance with a preferred embodiment of the present invention. The logic flow begins (501) when the communication infrastructure, preferably the system router, stores (502) the subscriber information, which subscriber information is conveyed to the system router by the data distribution server. In an alternate embodiment of the present invention, the subscriber information is also stored by the base site after being conveyed to the base site by the system router. The communication infrastructure, preferably the system router, determines an information service ID based on the subscriber information. Preferably, the information service ID is either contained in the subscriber information or is based on the contents of the subscriber information. In the preferred embodiment, the system router then conveys the information service ID to the system controller.

The communication infrastructure, preferably the system controller, determines (503) a subscription group based on the information service ID and by reference to the subscription group database. The communication infrastructure, preferably the system controller, determines (504) multiple communication unit ID's based on the subscription group and by reference to the subscription group database. Preferably each of the multiple communication unit ID's is uniquely associated with one of the multiple communication units. The communication infrastructure, preferably the system controller, then determines (505) a location, preferably the serving base site, of each of the multiple communication units based on the determined communication unit ID's and by reference to the location database.

In the preferred embodiment, all communication units served by the base site are tuned to a paging channel when active but not in session. The communication infrastructure, preferably the system controller, transmits (506), via the serving base site and the paging channel, a paging message comprising the multiple communication unit identifiers and information concerning an allocated communication channel. In response to the recognition of its own unique communication unit identifier in the paging message, each communication unit associated with one of the multiple communication unit identifiers tunes to the allocated communication channel referred to in the paging message. The communication infrastructure, preferably the system router, then transmits (507) the subscriber information via the serving base site allocated communication channel and the logic flow ends (508). Preferably the step of transmitting further comprises the step of storing, by the base site, the subscriber information.

In the preferred embodiment of the present invention, the step of transmitting (506) a paging message includes the steps of determining a communication channel for transmission of the paging message to produce a paging channel and allocating, by the communication infrastructure, a second communication channel for the transmission of the subscriber information to the multiple communication units. Preferably, the paging channel is a control channel that has already been allocated for the transmission of paging messages, and the step of allocating a second communication channel comprises the step of allocating a communication channel for the transmission of subscriber information when the system is set up. In an alternate embodiment of the present invention, the step of allocating a second communication channel preferably comprises the steps of determining, preferably by the system controller, the location, preferably the serving base site, of the multiple communication units, conveying the determined location to the system router, and assigning, by the system router, a second communication channel at the serving base site for the transmission of the subscriber information. The system router conveys information concerning the second communication channel to the system controller. The step of transmitting (506) a paging message then further includes the step of transmitting, by the system controller via the serving base site and the paging channel, a paging message comprising each of the multiple communication unit ID's and information concerning the second communication channel.

In the preferred embodiment, each of the multiple communication units recognizes, in the paging message, the communication unit ID associated with the communication unit and listens to the second communication channel identified in the paging message. Preferably, the step of transmitting (507) the subscriber information then further comprises the step of transmitting the subscriber information via the second communication channel. Preferably, the subscriber information comprises at least one information unit. When a communication unit has correctly received the at least one information unit, the communication unit transmits a confirmation. Preferably the confirmation comprises an acknowledgment; however, in the alternative, the confirmation comprises an index of incorrectly received information units or of correctly received information units.

In the preferred embodiment, when the communication infrastructure receives a confirmation of the information unit from all communication units associated with the multiple communication unit ID's, the logic flow ends (508). When the communication infrastructure fails to receive, within a predetermined period of time, a confirmation of the information unit from multiple communication units associated with the multiple communication unit identifiers, the step of transmitting (507) the subscriber information further comprises the step of retransmitting, preferably by the base site or in the alternate by the system router via the base site, the information unit via the second communication channel. The communication infrastructure continues to retransmit the information unit until correct receipt is confirmed, via index or acknowledgment, by at least all but one of the multiple communication units or until expiration of a predetermined number of transmissions, whichever first occurs.

In the preferred embodiment, when only one communication unit has failed to confirm the information unit, or when the information unit remains unconfirmed by one or more communication units after the expiration of the retransmission of the information unit by the base site, the step of transmitting (507) the subscriber information further comprises the following steps. The communication infrastructure, preferably the system router or alternately by the serving base site, assigns a separate communication channel at the base site to each communication unit that has failed to confirm correct receipt of the information unit. The communication infrastructure transmits a paging message via the paging channel, wherein the paging message comprises the communication unit identifier of the at least one communication unit and information concerning each separately assigned communication channel. The communication infrastructure then transmits the unconfirmed information unit via each separately assigned communication channel, and the logic flow ends (508).

In general, the present invention as described in FIG. 5 provides for the transmission of the subscriber information to the subscribing communication units. As described by FIG. 5, the transmission scheme provides a first point-to-multipoint communication session, then a second point-to-multipoint communication session for subscriber information that is unconfirmed after the first communication session, and then point-to-point communication sessions for subscriber information that remains unconfirmed after the second communication session.

The first communication session is point-to-multipoint in that the communication session comprises information that is being sent by a data router (the "point" in point-to-multipoint) to multiple communication units (the "endpoint" in point-to-multipoint) via the base site. The infrastructure transmits the information by first paging the group members on a first communication channel, preferably a control channel, and informs the members to listen to a second communication channel over which the information will be transmitted. The infrastructure then transmits the information over the second communication channel.

In the second point-to-multipoint communication session, the "point" endpoint is preferably moved up to the serving base site, while the "multipoint" endpoints continue to be the multiple subscription group members serviced by the base site. The serving base site retransmits, via the second communication channel, all data packets for which confirmations were not received from at least one of the subscribing communication units served by the base site.

In the point-to-point communication sessions, the base site individually assigns a separate communication channel to each subscribing communication unit that is served by the base site and that has not yet confirmed receipt of all information units. The base site pages each subscribing communication unit to inform the unit of the assigned communication channel and then transmits all remaining unacknowledged (i.e., unacknowledged by the subscription group member) data packets via the assigned communication channel. By engaging in this multi-tiered approach to the transmission of the subscriber information, the method provides a high reliability transmission scheme while using a minimum amount of infrastructure resources and bandwidth.

Figure 6:
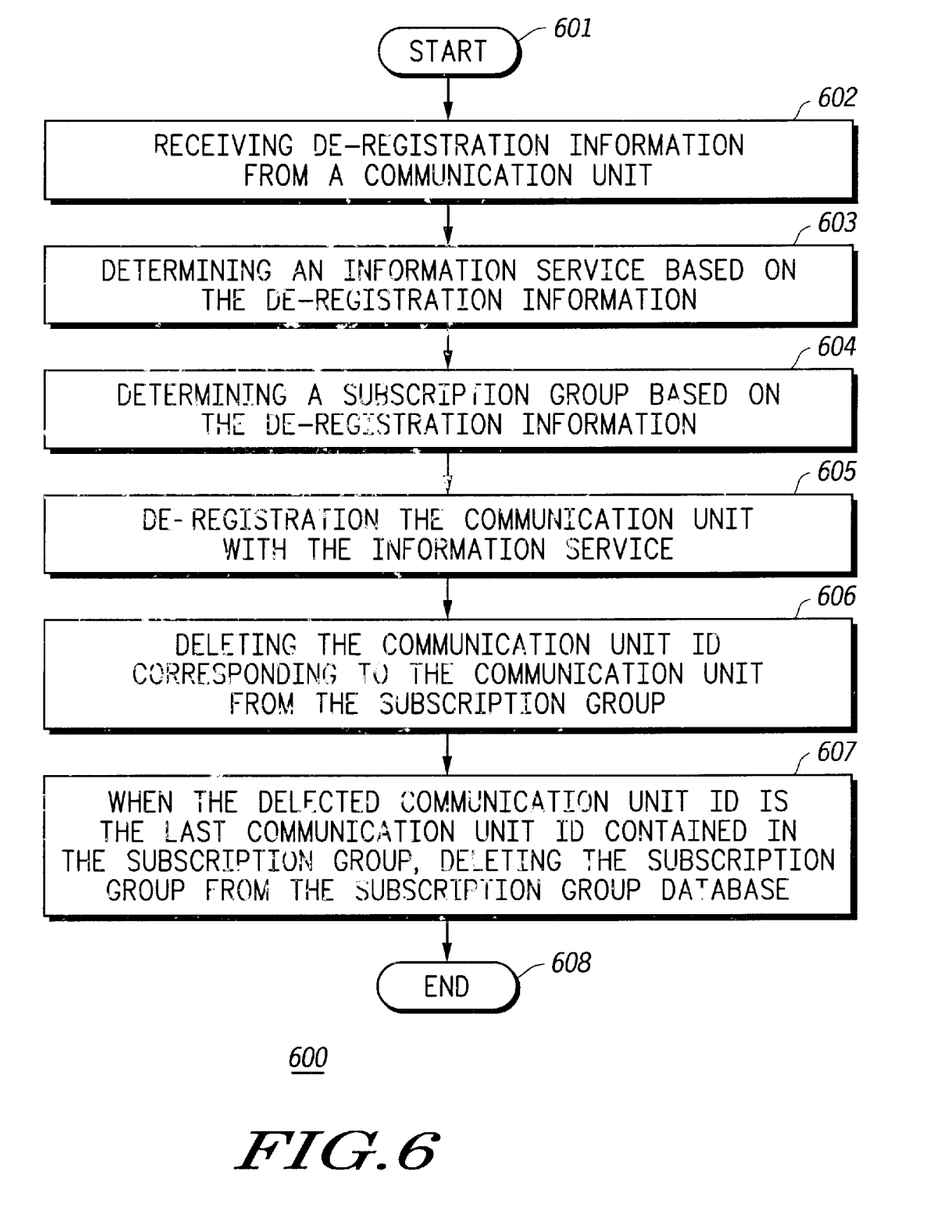
FIG. 6 is a logic flow diagram of steps executed by a communication infrastructure to de-register a communication unit in accordance with a preferred embodiment of the present invention.

FIG. 6 illustrates a logic flow diagram 600 of steps executed by a communication infrastructure to de-register a communication unit with an information service in accordance with a preferred embodiment of the present invention. The logic flow begins (601) when the communication infrastructure receives (602) de-registration information from the communication unit. Preferably, the de-registration information includes a communication unit ID for the de-registering communication unit and an information service ID corresponding to the information service to which the communication unit subscribes. Alternately, the information service ID can be determined based on the communication unit ID and by reference to a subscription group database or by reference to a communication unit record. The communication infrastructure determines (603) the information service based on the de-registration information and determines (604) a subscription group based on the de-registration information and by reference to a subscription group database. The infrastructure de-registers (605) the communication unit with the information service by transmitting de-registration information to an information source generating the information service. The infrastructure deletes (606) the communication unit ID from the subscription group. When the deleted communication unit identifier is the last communication unit ID contained in the subscription group, the communication infrastructure deletes (607) the subscription group from the subscription group database, and the logic flow ends (608).

The present invention, as described in FIG. 6, further provides for an efficient information distribution system by providing for the dynamic allocation of subscription groups. A communication unit is removed from a subscription group when the communication unit de-registers with the information service or detaches from the communication system, and subscription groups with no remaining members are removed from the communication system to free up memory and to allow for reuse of subscription group identifiers.

In sum, the present invention as described above provides a method and communication system for reliably and economically transmitting information from an Internet information service to a group of communication units subscribing to the service, by creating a subscription group comprising the subscribing communication units. In the present invention, when each subscribing communication unit registers with a communication system, the system receives registration information including a unique communication unit ID and information identifying the information service. The system registers the communication unit with the information service and sets up a subscription group, or call group, of subscribers to the service. The subscription group is stored in a subscription group database and includes an identifier of the information service and the identifiers of all registered communication units that subscribe to the service. If a registering communication unit subscribes to an information service for which a subscription group has already been set up, then the infrastructure adds the identifier for the communication unit to the subscription group. The infrastructure also stores the location, preferably the serving base site, of each communication unit in a location database.

When the infrastructure receives subscriber information intended for subscribers to the information service, the infrastructure identifies the communication units that subscribe to the information service by reference to the subscription group database and identifies the locations of the subscribing units by reference to the location database. The infrastructure then transmits the subscriber information to the subscribing units.

The information is transmitted via a multi-tiered transmission scheme. The transmission scheme provides a first and a second point-to-multipoint communication session, and then point-to-point communication sessions for subscriber information that remains unconfirmed after the two point-to-multipoint communication sessions.

By maintaining a subscription group that allows the communication system to identify and locate all subscribers to an information service, the communication system need only occupy communication resources, i.e., communication channels, at base sites servicing subscribing communication units when transmitting subscriber information. Furthermore, by engaging in the multi-tiered approach to the transmission of the subscriber information, the method and system provides a high reliability transmission scheme while using a minimum amount of infrastructure resources and bandwidth at each servicing base site.

While the present invention has been particularly shown and described with reference to particular embodiments thereof, it will be understood by those skilled in the art that various changes in form and details may be made therein without departing from the spirit and scope of the present invention.

We claim:

1. In a wireless communication system comprising an information source, a communication infrastructure, and a communication unit, a method for the reliable transmission of information by the communication infrastructure to the communication unit, the method comprising the steps of:

receiving information from the information source to produce subscriber information;

storing the subscriber information;

determining a subscription group based on the subscriber information, wherein the subscription group comprises a subscription group identifier and a communication unit identifier;

determining a communication unit identifier based on the subscription group, determining a communication unit location based on the communication unit identifier;

transmitting a paging message comprising the at least one communication unit identifier;

transmitting the subscriber information, wherein the step of determining a communication unit location comprises the step of determining a base site servicing the communication unit, and wherein the step of transmitting a paging message comprises the steps of determining a communication channel at the serving base site to produce a paging channel and transmitting, via the paging channel, a paging message comprising the at least one communication unit identifier; and determining a second communication channel at the serving base site for the transmission of the subscriber information, wherein the paging message further comprises information concerning the second communication channel and wherein the step of transmitting the subscriber information comprises the step of transmitting the subscriber information via the second communication channel, wherein the subscriber information comprises at least one Information unit and wherein the step of transmitting the subscriber information comprises the following steps:

transmitting the subscriber information via the second communication channel;

receiving a confirmation in response to the correct receipt of the at least one information unit by a communication unit of the plurality of communication units; and retransmitting the at least one information unit via the second communication channel when no confirmation is received from at least two communication units of the plurality of communication units.

2. In a wireless communication system comprising an information source, a communication infrastructure, and a communication unit, a method for the reliable transmission of information by the communication infrastructure to the communication unit, the method comprising the steps of:

receiving information from the information source to produce subscriber information;

storing the subscriber information;

determining a subscription group based on the subscriber information, wherein the subscription group comprises a subscription group identifier and a communication unit identifier;

determining a communication unit identifier based on the subscription group;

determining a communication unit location based on the communication unit identifier;

transmitting a paging message comprising the at least one communication unit identifier;

transmitting the subscriber information, wherein the step of determining a communication unit location comprises the step of determining a base site servicing the communication unit, and wherein the step of transmitting a paging message comprises the steps of determining a communication channel at the serving base site to produce a paging channel and transmitting, via the paging channel, a paging message comprising the at least one communication unit identifier; and determining a second communication channel at the serving base site for the transmission of the subscriber information, wherein the paging message further comprises information concerning the second communication channel and wherein the step of transmitting the subscriber information comprises the step of transmitting the subscriber information via the second communication channel, wherein the communication infrastructure comprises a system router coupled to a base site, wherein the subscriber information comprises at least one information unit, and wherein the step of transmitting the subscriber information comprises the following steps:

transmitting, by the system router, the subscriber information via the base site and the second communication channel;

storing, by the base site, the subscriber information;

receiving, by the base site, a confirmation in response to the correct receipt of the at least one information unit by a communication unit of the plurality of communication units; and retransmitting, by the base site and via the second communication channel, the at least one information unit via the second communication channel when no confirmation is received from at least two communication units of the plurality of communication units.

3. The method of claim 1 or 2, wherein the step of transmitting the subscriber information further comprises the steps of:

when correct receipt of the information unit remains is unconfirmed by only one communication unit of the plurality of communication units, or, responsive to the retransmission of the at least one information unit, when correct receipt of the information unit remains unconfirmed by at least one communication unit, assigning a separate communication channel to each communication unit that has failed to confirm correct receipt of the at least one information unit;

transmitting a paging message, wherein the paging message comprises the communication unit identifier of the at least one communication unit and information concerning each separately assigned communication channel;

transmitting the unconfirmed at least one information unit via each separately assign communication channel.

4. A communication infrastructure for use in a wireless communication system that comprises the communication infrastructure, an information source, and a communication unit, the communication infrastructure comprising:

a base site that services the communication unit, wherein the communication unit subscribes to an information service provided by the Information source;

a data distribution server, coupled to the base site, that receives registration information from the communication unit, wherein the registration information comprises an information service identifier and a communication unit identifier, conveys at least a portion of the registration information to the information source, conveys at least a portion of the registration information to a system router, receives subscriber information from an information source, and conveys the subscriber information to a system router:

a system router, coupled to the base site and to the data distribution server, that determines an information service identifier based on the registration information received from the communication unit, conveys the information service identifier and the communication unit identifier to a system controller, receives the subscriber information from the data distribution server, and transmits the subscriber information with reference to a subscription group database and a location database;

a system controller, coupled to the system router, that determines a subscription group based on the information service identifier received from the system router and with reference to a subscription group database, and adds the communication unit identifier to the subscription group;

a subscription group database, coupled to the system controller, that comprises a subscription group, wherein the subscription group comprises an information service identifier and a communication unit identifier; and a location database, coupled to the system controller, that comprises the location of the communication unit, wherein the communication system further comprises a plurality of communication channels, wherein the plurality of communication channels comprises a first communication channel for the transmission of paging messages and a second communication channel for the transmission of the subscriber information, wherein the data distribution server further receives subscriber information from the information source intended for the communication unit and conveys the subscriber information to the system router, which subscriber information comprises at least one information unit, wherein the system router further determines an information service identifier based on the subscriber information, and conveys the information service identifier, and wherein the system controller further determines the communication unit identifier based on the subscription group database and transmits a paging message, via the base site and the first communication channel, comprising the communication unit identifier and information concerning the second communication channel, wherein the system router transmits the subscriber information via the base site and the first communication channel, and wherein the base site further stores the subscriber information and retransmits the information unit when the base site fails to receive a confirmation of correct receipt of the information unit by the communication unit.

5. The communication infrastructure of claim 4, wherein the subscription group database is located in the system controller.

6. The communication infrastructure of claim 4, wherein the location database is located in the system controller.

7. The communication infrastructure of claim 4, wherein the system router further allocates a third communication channel of the plurality of communication channels for transmission of the information unit when the base site fails to receive a confirmation of correct receipt of the retransmitted information unit by the communication unit, and wherein the base site further transmits the unconfirmed retransmitted information unit via the third communication channel.

* * * * *